C. E. SARGENT.
ELECTRIC COOKING DEVICE.
APPLICATION FILED MAY 20, 1911.
1,072,170.
Patented Sept. 2, 1913.
2 SHEETS—SHEET 2.
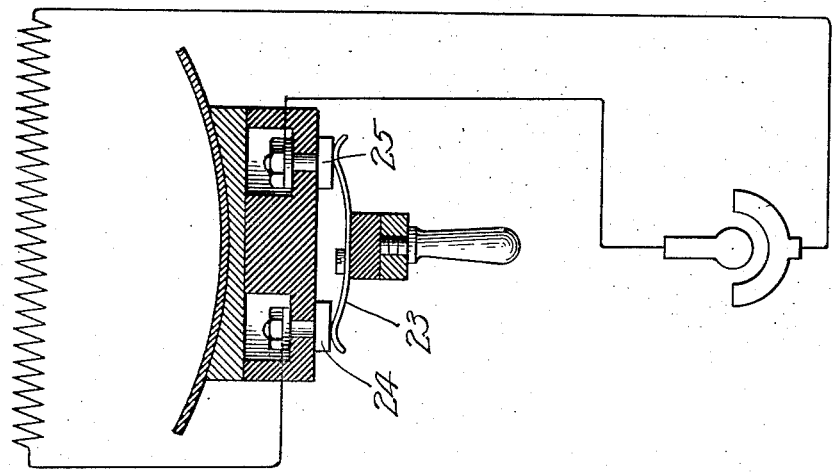
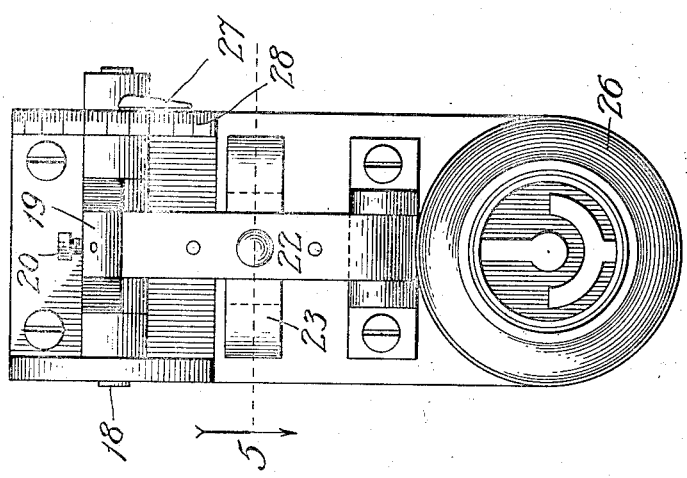
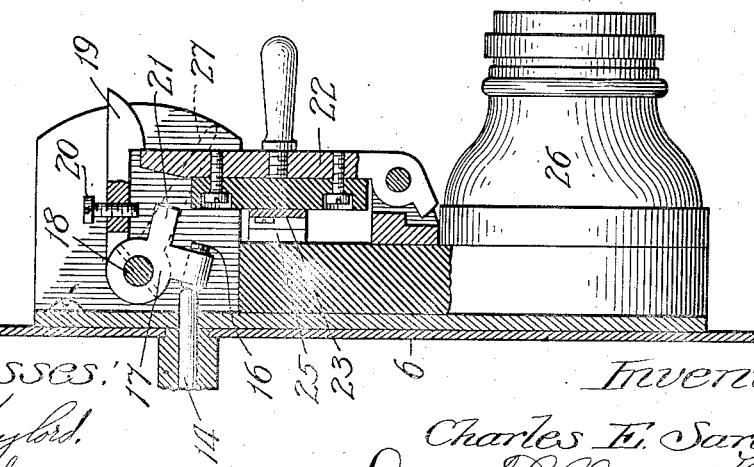
Witnesses:
C. C. Gaylord
G. F. Chase
Inventor:
Charles E. Sargent,
By Dyrenforth, Lee, Chritton & Wiles,
Attys.

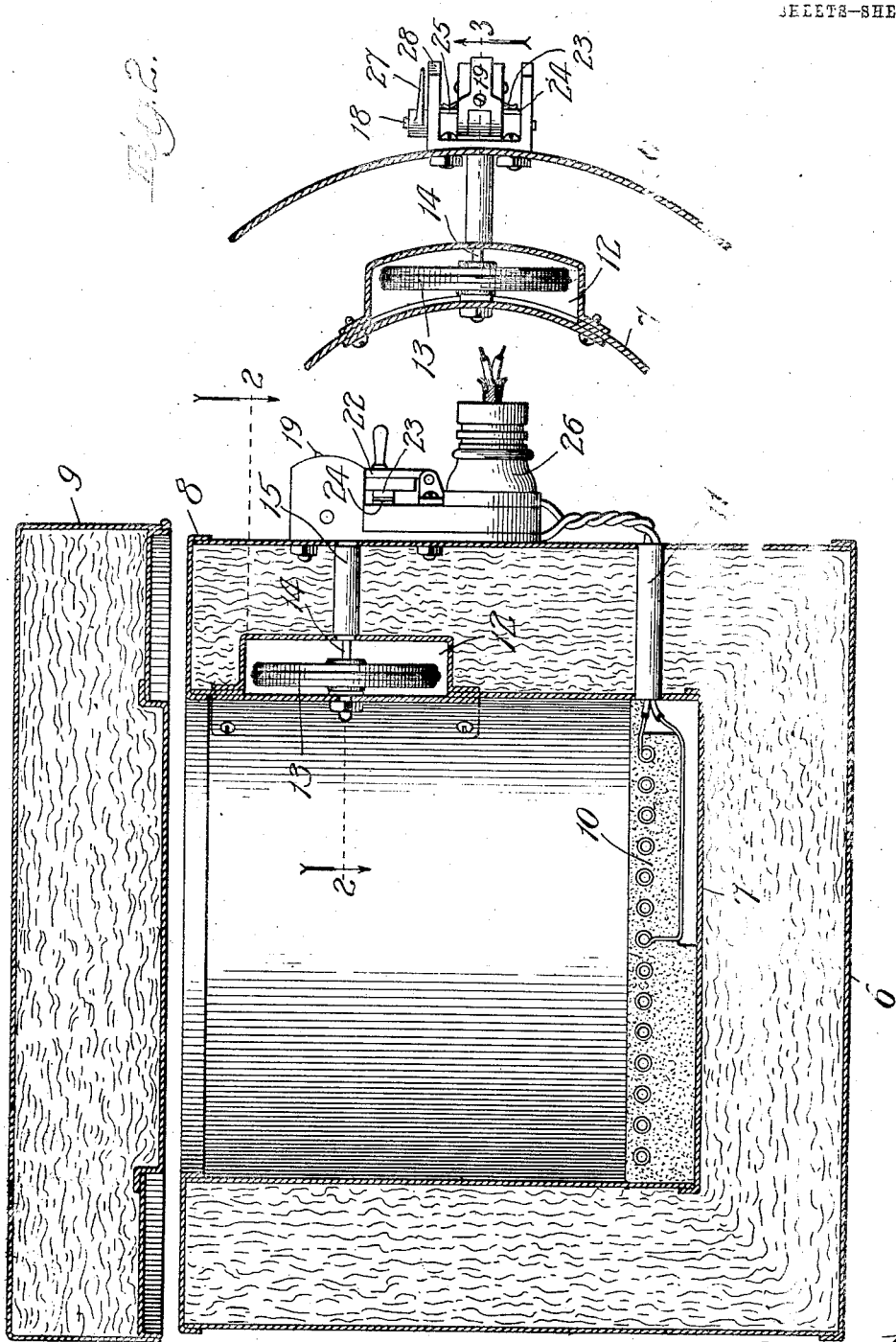

UNITED STATES PATENT OFFICE.

CHARLES E. SARGENT, OF CHICAGO, ILLINOIS.

ELECTRIC COOKING DEVICE.

1,072,170.  Specification of Letters Patent.  Patented Sept. 2, 1913.

Application filed May 20, 1911. Serial No. 628,442.

*To all whom it may concern:*

Be it known that I, CHARLES E. SARGENT, a citizen of the United States, residing at Chicago, in the county of Cook and State of Illinois, have invented a new and useful Improvement in Electric Cooking Devices, of which the following is a specification.

My invention relates to certain new and useful improvements in electric cooking devices, and is fully described and explained in the specification and shown in the accompanying drawings, in which:

Figure 1 is a vertical section through my improved device; Fig. 2 is a horizontal section on the broken line 2 of Fig. 1; Fig. 3 is a radial section on the line 3 of Fig. 2; Fig. 4 is an elevation of the switch mechanism and Fig. 5 is a diagrammatic view of the circuit.

Referring to the drawings, 6 is the outer and 7 is the inner wall of a double walled case or cooker proper, the two walls being insulated by a suitable insulating material, such as mineral wool or the like, and connected at the top by an annulus 8, in accordance with common practice in fireless cooking constructions.

9 is a cover of metal fitting tightly to the lower section and provided with a suitable insulation in accordance with common practice.

10 is an electrical heating element placed at the bottom of the cooker proper, as illustrated. This heating element may be of any desired form common in the art, its particular arrangement having no bearing upon my present invention.

11 is a tube connecting the inner and outer walls of the cooker and affording a passage-way for the electric-wires which supply current to the heating element.

Between the walls of the cooker proper is a chamber 12 lying well within the outer wall so as to be thoroughly insulated from the outside air and in position to be affected by the heat in the cooker proper by conduction through the inner wall. This chamber 12 contains a hollow expansible air-diaphragm 13, one wall of which is attached to the inner wall 7 of the cooker and the opposite wall of which carries a pin 14 which extends outward through a tube 15 to the outside of the cooker. The outer end of the pin 14 is adapted, as it moves outward, to engage a screw on an arm 16 of a bell-crank lever 17 pivoted on a pin 18. Upon the same pin is pivoted a hook 19 carrying an adjusting screw 20, which is adapted to be engaged by an arm 21 on the bell-crank lever 17 as the same is moved. The outer end of the hook 19 engages the upper end of a switch-lever 22 carrying a contact piece 23 adapted to engage two contact plates 24 and 25. The contact plate 24 is connected to one end of the heating element and the other end of the heating element is connected to one terminal of a socket 26. The contact plate 25 is connected, as illustrated in Fig. 5, with the other terminal of the socket 26. Thus, when the socket is wired to a source of electric current and the switch-lever 22 is elevated so that the contact piece 23 connects the contacts 24 and 25, the current will flow through the heating element in an obvious manner. As the temperature inside of the cooker rises, the air-diaphragm 13 will expand forcing the pin 14 outward and rotating the bell-crank lever 17 on its axis so that the arm 21 will presently engage the screw 20 of the hook 19, freeing the same from the end of the switch-lever 22 so that the natural elasticity of the contact piece 23 assisted by gravity will cause the switch-lever to swing downward, breaking the circuit.

The apparatus is set so that it will automatically break its circuit at any desired point in the following manner. The spindle of the bell-crank lever 17 carries an indicating needle 27, which coöperates with a temperature scale 28. In setting the device, this needle is moved by hand to that point where it is desired to have the further flow of current cease. While holding the indicating needle in this position the screw 20 is adjusted by screwing it downward until the switch-lever is freed from the hook. The material to be cooked is then placed in the cooker and the cover placed in position, and the bell-crank lever and indicating needle are permitted to fall to their normal positions. As the air-diaphragm expands and the pin 14 moves outward, rotating the bell-crank lever, the hook will obviously release the switch-lever at just that point determined by the previous adjustment. In this way it is made perfectly certain that the flow of current will be cut off at the proper temperature and there is no danger that the contents of the cooker will be cooked too much.

I am aware that it has heretofore been proposed to build inclosed cookers with an electric heating element, and that efforts have been made to incorporate a thermostatic device for cutting off the flow of current when the temperature within the cooker has reached the desired point. There are, however, conditions of a peculiar nature surrounding devices of this character which make the present form of thermostatic device substantially the only practical device for the purpose. The device must be capable of a very wide range of adjustment, different foods requiring temperatures varying to enormous extents. The device must be compact. Any device which must necessarily cross the cooking space is absolutely out of the question because the food could not be placed in and removed from the cooker with such a device in use. The device must be wholly concealed and protected from the deleterious effects of food which may be spilled upon it. It must be simple, absolutely unfailing in its action and capable of adjustments by those wholly unversed in mechanics. These various problems and requirements make it impossible to select any ordinary thermostatic device in use and apply it to a device of this character, but on the contrary as far as I am aware, they make the present thermostatic device broadly considered the only practical type.

I am aware that considerable variation is possible in the details of the mechanical construction here set forth, without departing from the spirit of my invention and I therefore, although I have fully described the present form in detail, do not intend to be limited thereto, except as pointed out in the following claims in which it is my intention to claim all the novelty of the present device as broadly as the state of the art will permit.

I claim as new and desire to secure by Letters Patent—

1. In combination, insulating walls inclosing a cooking chamber, an electrical-heating element within the cooking chamber, a recess in one of the walls of the chamber, a hollow gas-containing box in said recess and exposed to the heat within the chamber and insulated from the atmosphere, an electrical-switch and connections between one wall of the box and a switch for opening the same.

2. In combination, insulating walls inclosing a cooking chamber, an electrical-heating element for supplying heat to the chamber, an electrical-switch device controlling the flow of current through said heating element, a hollow gas-containing box having one wall fixed in position in a recess in one of the chamber-walls and exposed to the heat within the chamber and insulated from the atmosphere and connections between another wall of the hollow gas-containing box and the electrical-switch device.

3. In combination, insulating walls inclosing a cooking chamber, an electrical-heating element for supplying heat to the chamber, an electrical-switch device for controlling the flow of current through said heating element, a hollow gas-containing box having one wall fixed in position in a recess in one of the chamber-walls and exposed to the heat within the chamber and insulated from the atmosphere, and adjustable connections between another wall of the hollow gas-containing box and the electrical-switch device.

4. In combination, insulating walls inclosing a cooking chamber, an electrical-heating element for supplying heat to the chamber, a hollow gas-containing box supported in a recess in one of the walls and having a thrust-rod extending from one of its walls without the chamber, an electrical-switch device, a latch for holding this switch device normally closed, and connections between the thrust-rod and the latch.

5. In combination, insulating walls inclosing a cooking chamber, an electrical-heating element for supplying heat to the chamber, a hollow gas-containing box supported in a recess in one of the walls and having a thrust-rod extending from one of its walls without the chamber, an electrical switch device, a latch for holding the switch-device normally closed, and adjustable connections between the thrust-rod and the latch.

6. In combination, insulating walls inclosing a cooking chamber, an electrical-heating element for supplying heat to the chamber, a hollow gas-containing box supported in a recess in one of the walls and having a thrust rod extending from one of its walls without the chamber, an electrical-switch device, a latch for holding the switch-device normally closed, a bell-crank lever contacted by the thrust-rod and an adjusting screw on the latch to be struck by the bell-crank lever in its movement for the purpose set forth.

In testimony whereof I hereunto set my hand this 5th day of May, 1911.

CHARLES E. SARGENT.

In the presence of two subscribing witnesses:
J. G. ANDERSON,
R. A. SCHAEFER.